United States Patent [19]

Hopkins

[11] 4,430,806
[45] Feb. 14, 1984

[54] MICROWAVE AGRICULTURAL DRYING AND CURING APPARATUS

[76] Inventor: Harry C. Hopkins, Rte. 2, Box 109, Williamston, N.C. 27892

[21] Appl. No.: 319,900

[22] Filed: Nov. 10, 1981

[51] Int. Cl.³ .............................................. F26B 23/08
[52] U.S. Cl. .................................... 34/1; 219/10.55 D
[58] Field of Search ....... 34/1; 219/10.55 A, 10.55 D, 219/10.55 R, 10.55 M

[56] References Cited

U.S. PATENT DOCUMENTS

| | | | |
|---|---|---|---|
| 1,658,775 | 2/1928 | Campbell | 34/86 |
| 4,039,795 | 8/1977 | Laszlo et al. | 219/10.55 A |
| 4,043,051 | 8/1977 | Lussenden | 34/229 |
| 4,209,918 | 7/1980 | Klein | 34/86 |
| 4,330,946 | 5/1982 | Courneya | 34/1 |

Primary Examiner—Larry I. Schwartz
Assistant Examiner—David W. Westphal
Attorney, Agent, or Firm—Darby & Darby

[57] ABSTRACT

A method and apparatus for drying organic products utilizing a microwave heater in a cavity. In order to prevent the microwaves from leaking out of the cavity while the products are being transported through it by a conveyor, labyrinth seals are located at both the entrance and exit to the cavity.

7 Claims, 3 Drawing Figures

MICROWAVE AGRICULTURAL DRYING AND CURING APPARATUS

BACKGROUND OF THE INVENTION

This invention relates to the drying or curing of agricultural or other organic products prior to use or storage and, more particularly, to apparatus for drying or curing such products in a relatively short period of time.

Tobacco must be cured before it can be used for smoking products. This is normally accomplished by allowing it to hand in curing sheds over long periods of time. Such sheds use a great deal of space and require periodic maintenance. Further, a great amount of manual effort is required to place the tobacco in the shed and to remove it once it has been cured.

Grains such as soybeans, peanuts, corn, sugarcane, etc. must be dried before they can be stored in silos. Typically 10-15% of their moisture content must be removed. In order to accomplish this drying, open-topped trailers in which the grain is gathered are positioned adjacent to an oil or gas fired heater. A conduit is connected from the heater to the bottom of the trailer and hot air from the heater is forced upward through the grain by a fan. Farmers must pay for this drying process or must sell their moist grain at a lower price. Drying of grain by forced hot air (i) is time consuming, requiring two to five days, (ii) is energy inefficient, since the air exiting from the trailer is still at a very high temperature, and (iii) requires the movement of large numbers of trailers from the field to the heater and then to the storage facility.

Microwave technology has for sometime been utilized to cook food. However, in this application it must be assured that the microwaves are confined to the oven in which the cooking is performed so that they do not harm the user. To this end microwave ovens are provided with a great deal of insulation and special doors that reduce leakage. As a result, the use of microwaves for in-line operations involving the transport of items on a conveyor belt into a microwave field is not indicated in the prior art.

SUMMARY OF THE INVENTION

The present invention is directed to the rapid drying or curing of agricultural or other organic products by passing such products along a conveyor into a controlled microwave field.

In an illustrative embodiment of the invention, agricultural products, e.g. soybeans, peanuts, corn, etc., are moved along a conveyor belt to a raised position. Then the products or grains are allowed to fall by the force of gravity through a labyrinth microwave seal into a microwave chamber. While being conveyed in the chamber on another conveyor belt the products are heated sufficiently to drive off approximately 10-15% of their moisture content without damaging them. After leaving the mircrowave chamber, the products drop through another labyrinth microwave seal into a transportation trailer for movement to a storage silo.

In one embodiment of the invention the microwave drying device with its labyrinth seals is installed along a conveyor on a combine or the trailer pulled by the combine, and removes the excess moisture as the products are being harvested.

Another embodiment of the invention utilizes a stationary drying shed equipped with a microwave heater. The shed may have special doors and insulation to confine the microwaves. However, if the products are to be moved through the shed on a conveyor belt, the entrance and exit of the shed must be equipped with labyrinth seals.

BRIEF DESCRIPTION OF THE DRAWINGS

The foregoing and other features of the present invention will be more readily apparent from the following detailed description and drawings of illustrative embodiments of the invention in which.

DESCRIPTION OF ILLUSTRATIVE EMBODIMENTS

Figure 1:
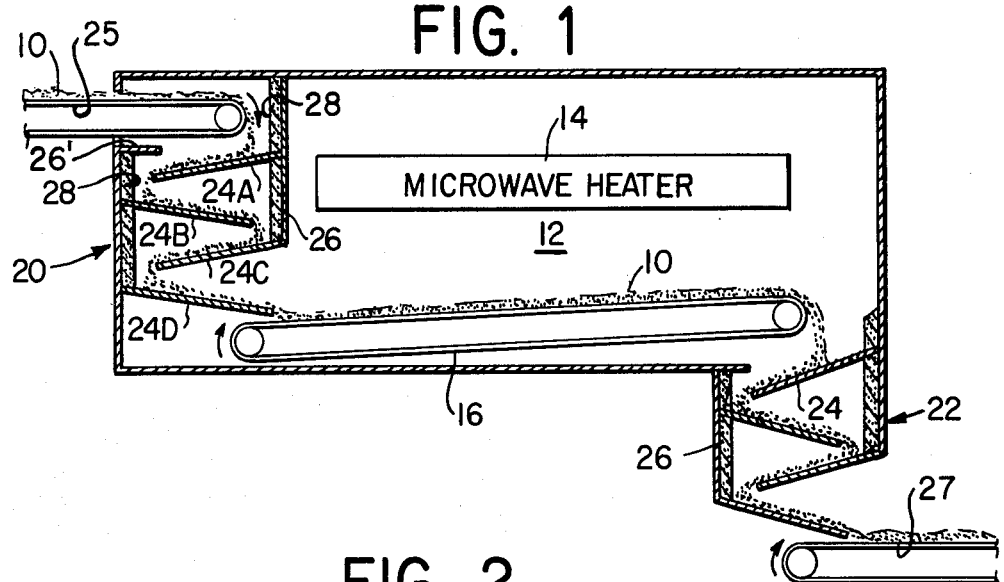
FIG. 1 schematically illustrates a microwave drying device arranged along a conveyor belt.

In order to reduce the moisture content of grains or other organic products so that they can be stored without excessive rot, and of tobacco so as to cure it, the products can be heated to drive off the moisture. The time required to accomplish this can be greatly reduced with the microwave apparatus shown in FIG. 1. By means of this apparatus the products 10 are heated in a microwave chamber or cavity 12 with a microwave source 14.

As is well known, microwaves heat very rapidly compared to heating by ordinary combustion. However, in the present application microwaves are particularly suitable because they heat the entire pile of products uniformly, and not just the outer layers. Thus it is distinguishable from using hot gases which would generally be unable to heat the products fast enough and uniformly enough for an in-line operation. If the heat content of the gases were increased to speed up the conventional drying process, the outer layers would be burned or dried too much, while the middle layers of the product would be unaffected.

Quantities of product may be placed in the chamber 12, the doors closed and the drying or curing process carried out. However, the manipulations required for such an arrangement are time consuming and costly. It is far more efficient to have the product carried into the chamber on a conveyor belt 16 and dried as the belt moves through the chamber. The problem is that such an arrangement requires the entrance and exit of the microwave chamber to be open, which means that the microwaves may escape from the chamber and pose a health hazard to workers in the vicinity. In order to avoid the escape of the microwaves, while still allowing the use of a conveyor belt, labyrinth seals 20, 22 are positioned at the entrance and exit, respectively, to the chamber.

Each of the seals 20, 22 includes downwardly sloping and intersecting metal plates 24. These plates form a meandering path through a housing 26 whose interior surface 28 is coated with a material that is a microwave attenuator, e.g. a losy material such as a sheet of material containing powdered carbon. A suitable attenuator made from a carbon-loaded plastic form is sold under the name ECCO SORB. Since microwaves move in straight lines and the plates are grounded so as to block or reflect them, the lower two plates 24C, 24D effectively prevent the escape of most of the microwaves.

Any microwaves that pass between these plates will be absorbed by material 28 on the interior of housing 26. If there is any reflection of microwaves from the interior surface, it has to get beyond plates 24B, 24C and a second impact with the interior surface 28. This is repeated for plates 24A, 24B, as well as plate 24 and the top surface 26' of the housing. Thus, there is little possibility for any escape of microwaves, but the product may still freely enter the microwave cavity.

Grain or other product to be dried is moved from a trailer or even directly from a combine by an elevator which may have conveyor belt 25 at its end. This conveyor belt 25 dumps product into seal 20 where it runs down the plates 24 and is deposited on conveyor 16. This conveyor carries it into cavity 12 where it is dried by microwave heater 14 so as to reduce its moisture content by about 10-15%. Rather than taking several days to accomplish this, it can be done in a period from several hours to several minutes, depending on the ability of the product to withstand heating. The moisture removed from the product passes up through seal 20 as water vapor, while the dried product falls through seal 22 on to conveyor 27 for transport to a storage bin. The movement of conveyor belt 25, 16 and 27 is controlled so that the product spends the proper amount of time in the microwave cavity and no build-up of product occurs in the cavity. The exact time required for each type of product and the amount of moisture to be removed, can be determined by simple tests.

Figure 2:
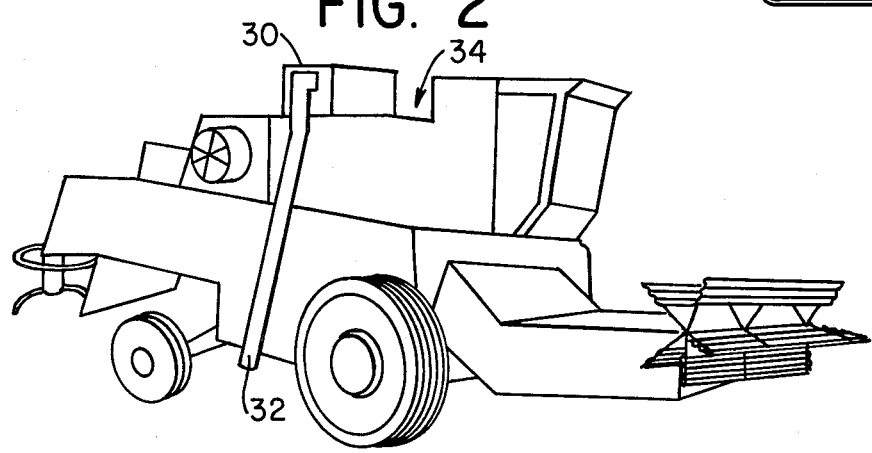
FIG. 2 shows schematically the placement of the drying device of FIG. 1 on a combine.

The drying apparatus of FIG. 1 is particularly effective if it is mounted on a combine as shown in FIG. 2. In this arrangement the microwave device 30 is positioned at the end of an elevator 32. It dries the product before it is deposited into the combine storage bin 34. Since the elevator and bin are both made of metal and enclose the microwave device, the seals 20, 22 may be eliminated if desired. However, it is preferably to keep the seals so that repair work can be carried out within these structures without endangering the operating personnel.

Figure 3:
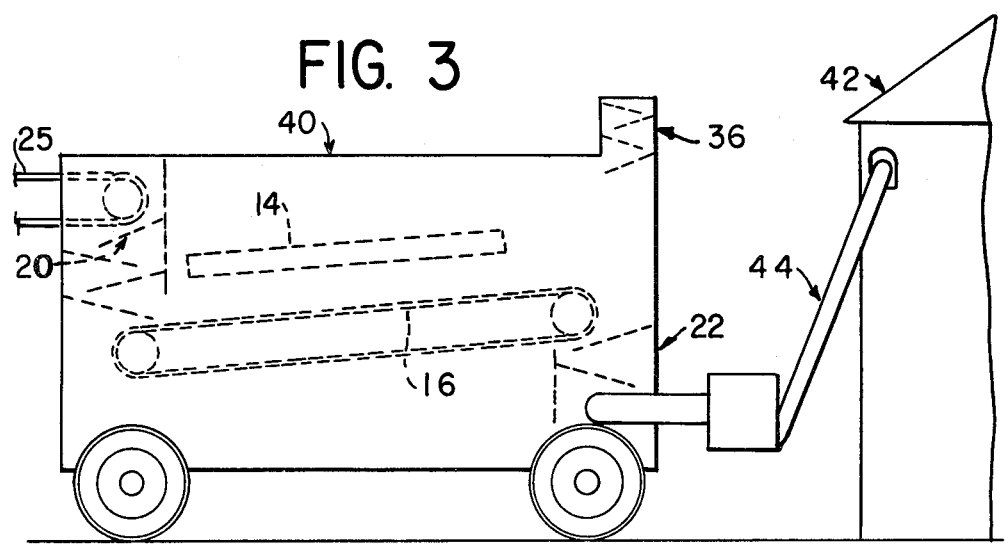
FIG. 3 illustrates in schematic fashion a drying shed or trailer.

As another alternative the microwave drying appratus can be located in a mobile trailer or a stationary shed 40 located next to a storage silo 42 as shown in FIG. 3. The trailer includes entrance and exit labyrinth seals 20, 22 as well as the microwave heater 12 and conveyor 16. In addition a moisture exhaust vent 36 with a labyrinth seal is provided to increase the amount of moisture removed from the cavity. Upon leaving the trailer on a conveyor, the dried product is placed on an elevator 44 so that it can be deposited into silo 42 near its top.

The design of the conveyors for moving product will depend on the type of product. When the product is grain, a belt with raised sides or an endless chain of trays may be used. If tobacco is being cured, conventional tobacco drying trays or racks can be used. It is also possible to use the basic principles of this invention to dry wood in the form of logs or lumber. Depending on the size of the logs or the thickness of the lumber, the seals would, of course, be appropriately increased in size and the conveyors would be modified to transport them. However, regardless of the design, the trays should not be made of metal which would absorb microwave energy and become heated. Rather, they should be made of plastic or rigid paper.

While the invention has been particularly shown and described with reference to preferred embodiments thereof, it will be understood by those skilled in the art that various changes in form and details may be made therein without departing from the spirit and scope of the invention.

I claim:

1. A method of drying organic products comprising the steps of:

continuously passing said products into an operating microwave cavity through labyrinth seals that create a meandering path so that the microwaves cannot escape from said cavity due to said meandering path, heating said products so as to drive off at least 10% of their moisture content, but without damaging said products, and continuously removing said products from the microwave cavity through labyrinth seals that create a meandering path so that the microwaves cannot escape from said cavity.

2. The method of claim 1, wherein the products are passed into the cavity from a grain elevator of a combine and are removed from the cavity into a storage bin of the combine.

3. Microwave drying apparatus for drying organic products, comprising a microwave source located in a cavity, said cavity having entrance and exit openings, labyrinth seals that create a meandering path located respectively on the entrance and exit openings such that the products may be continuously entered into and removed from the cavity without the escape of microwaves therefrom due to said meandering path, and a conveyor for moving the products within the cavity between the entrance and exit openings.

4. A microwave drying apparatus as claimed in claim 3, wherein each labyrinth seal includes a vertical housing opening at the top and bottom whose interior is covered with a material that absorbs microwaves, and a plurality of downwardly sloping plates extending from opposite walls of the housing and alternately arranged so as to form a meandering path for products deposited at the top and exiting at the bottom, the seal at the entrance being adapted to receive product at its top and to deliver it to the cavity at its bottom due to gravity, the seal at the exit being adapted to receive dried product from the cavity and to deliver it outside the cavity at its bottom due to gravity.

5. A microwave drying apparatus as claimed in claim 4, further including conveyors for moving product to the top of the seals.

6. A microwave drying appratus as claimed in claims 3 or 4, wherein said apparatus is positioned on a combine equipped with an elevator adapted to transport grain to a storage bin therein, said microwave drying apparatus being located in the path of product travel between the elevator and the storage bin.

7. A microwave drying apparatus as claimed in claims 3 or 4, wherein said apparatus is positioned within a trailer positioned adjacent a silo.

* * * * *